US012253003B1

(12) United States Patent
Binek et al.

(10) Patent No.: US 12,253,003 B1
(45) Date of Patent: Mar. 18, 2025

(54) INTEGRAL STATOR VANE WELD SHIELD

(71) Applicant: Raytheon Technologies Corporation, Farmington, CT (US)

(72) Inventors: Lawrence A. Binek, Glastonbury, CT (US); Jesse R. Boyer, Middletown, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/453,093

(22) Filed: Aug. 21, 2023

(51) Int. Cl.

| | |
|---|---|
| ***F01D 25/28*** | (2006.01) |
| ***B22F 7/06*** | (2006.01) |
| ***B22F 10/28*** | (2021.01) |
| ***F01D 9/04*** | (2006.01) |

(52) U.S. Cl.
CPC ............ *F01D 25/285* (2013.01); *B22F 7/062* (2013.01); *B22F 10/28* (2021.01); *F01D 9/041* (2013.01); *F01D 9/044* (2013.01); *F05D 2230/234* (2013.01); *F05D 2230/80* (2013.01)

(58) Field of Classification Search
CPC ........ F01D 25/285; F01D 9/041; F01D 9/044; B22F 7/062; B22F 10/28; F05D 2230/234; F05D 2230/80
See application file for complete search history.

(56) References Cited

U.S. PATENT DOCUMENTS

| | | | | |
|---|---|---|---|---|
| 5,182,855 | A * | 2/1993 | Martin | B23P 15/006 29/889.22 |
| 6,233,822 | B1 * | 5/2001 | Grossklaus, Jr. | C23C 10/02 29/889.7 |
| 6,494,677 | B1 * | 12/2002 | Grady | F01D 9/04 29/889.7 |
| 8,950,069 | B2 * | 2/2015 | Ress, Jr. | F01D 25/246 164/47 |
| 9,085,980 | B2 * | 7/2015 | Mittendorf | F01D 5/005 |
| 9,266,170 | B2 * | 2/2016 | Godfrey | C30B 11/00 |
| 10,196,910 | B2 * | 2/2019 | Jennings | F01D 9/065 |
| 10,689,990 | B2 * | 6/2020 | Evans | F01D 5/18 |
| 10,994,363 | B2 * | 5/2021 | Trinco | B23K 11/36 |
| 11,980,938 | B2 * | 5/2024 | Nelson | B33Y 80/00 |

(Continued)

FOREIGN PATENT DOCUMENTS

EP 3351320 A2 7/2018

OTHER PUBLICATIONS

Extended European Search Report for EP Application No. 24194970.0, Dated Jan. 30, 2025, pp. 6.

*Primary Examiner* — Brian Christopher Delrue
(74) *Attorney, Agent, or Firm* — Kinney & Lange, P. A.

(57) ABSTRACT

A stator vane for a gas turbine engine combustor has a vane segment that includes a vane having a leading edge, a trailing edge, a suction side, a pressure side, a vane inner base, and a vane outer base, an inner shroud segment attached to the vane at the vane inner base, and an outer shroud segment attached to the vane at the vane outer base. The stator vane further includes a support structure attached to the vane at a vane trailing edge, and a first weld shield attached to the support structure by a first connector. The first weld shield is positioned over and spaced away from the suction side. The vane, inner shroud segment, outer shroud segment, support structure, and first weld shield are integrally formed during a single, continuous additive manufacturing process.

20 Claims, 6 Drawing Sheets

(56) References Cited

U.S. PATENT DOCUMENTS

| | | | | |
|---|---|---|---|---|
| 2001/0005555 | A1* | 6/2001 | Kreis | F04D 29/584 428/596 |
| 2006/0045748 | A1* | 3/2006 | Cahoon | B23K 37/06 416/223 R |
| 2007/0095797 | A1* | 5/2007 | Beeson | B23K 35/34 219/146.52 |
| 2007/0235505 | A1 | 10/2007 | Meier | |
| 2010/0061846 | A1* | 3/2010 | Herbst | F01D 5/005 29/888.021 |
| 2012/0134778 | A1* | 5/2012 | Khanin | F01D 5/081 415/115 |
| 2016/0222822 | A1* | 8/2016 | Jennings | F01D 5/282 |
| 2017/0159468 | A1* | 6/2017 | Granberg | F01D 11/001 |
| 2018/0010458 | A1 | 1/2018 | Chabane et al. | |
| 2022/0251968 | A1* | 8/2022 | Taylor | F01D 25/246 |
| 2024/0133297 | A1* | 4/2024 | Barua | B22F 5/04 |

* cited by examiner

INTEGRAL STATOR VANE WELD SHIELD

BACKGROUND

The present disclosure relates generally to gas turbine engine stator vane rings and, more particularly, to a replacement stator vane made with a powder bed fusion additive machine.

As well known, gas turbine engines include a compressor section, combustor section, and turbine section. Many gas turbine engines used for aviation propulsion include a fan section upstream of the compressor section and, in some configurations, a gear box between the fan section and the compressor section. The compressor section may be further divided into two or more compressors (e.g., a low pressure compressor and a high pressure compressor). Similarly, the turbine section may be divided into two or more turbines (e.g., high pressure turbine and a low pressure turbine). The compressors and turbines are formed from successive stages of stationary vanes (i.e., stator vanes) and rotating blades. While turbine blades and vanes typically include internal cooling features that require them to be cast as individual parts, compressor stator vanes and blades are typically solid parts and can be formed as complete stator vane rings (for compressor vanes) or integrally bladed rotors (for compressor blades). Such components can be made using traditional casting methods or by additive manufacturing methods. Regardless of the manufacturing method used to make these parts, these parts, particularly stator vane rings, can have low yields that result in many parts being scrapped.

SUMMARY

One aspect of this disclosure is directed to a stator vane for a gas turbine engine combustor having a vane segment that includes a vane having a leading edge, a trailing edge, a suction side, a pressure side, a vane inner base, and a vane outer base, an inner shroud segment attached to the vane at the vane inner base, and an outer shroud segment attached to the vane at the vane outer base. The stator vane further includes a support structure attached to the vane at a vane trailing edge, and a first weld shield attached to the support structure by a first connector. The first weld shield is positioned over and spaced away from the suction side. The vane, inner shroud segment, outer shroud segment, support structure, and first weld shield are integrally formed during a single, continuous additive manufacturing process.

Another aspect of the disclosure is directed to a method of making a stator vane for a gas turbine engine combustor that includes integrally forming during a single, continuous additive manufacturing process: a vane segment having a vane having a leading edge, a trailing edge, a suction side, a pressure side, a vane inner base, and a vane outer base; an inner shroud segment attached to the vane at the vane inner base; and an outer shroud segment attached to the vane at the vane outer base. A support structure attached to the vane at a vane trailing edge; and a first weld shield attached to the support structure by a first connector are also integrally formed during the same single, continuous additive manufacturing process. The first weld shield is positioned over and spaced away from the suction side.

Yet another aspect of the disclosure is directed to a method of replacing a damaged stator vane in a gas turbine engine combustor stator vane ring, including identifying the damaged stator vane in the gas turbine engine combustor stator vane ring, removing the damaged stator vane from the gas turbine engine combustor stator vane ring to create an opening in the gas turbine engine combustor stator vane ring, inserting into the opening in the gas turbine engine combustor stator vane ring a stator vane described above, and removing the first weld shield and the support shield from the stator vane.

DETAILED DESCRIPTION

Figure 1:
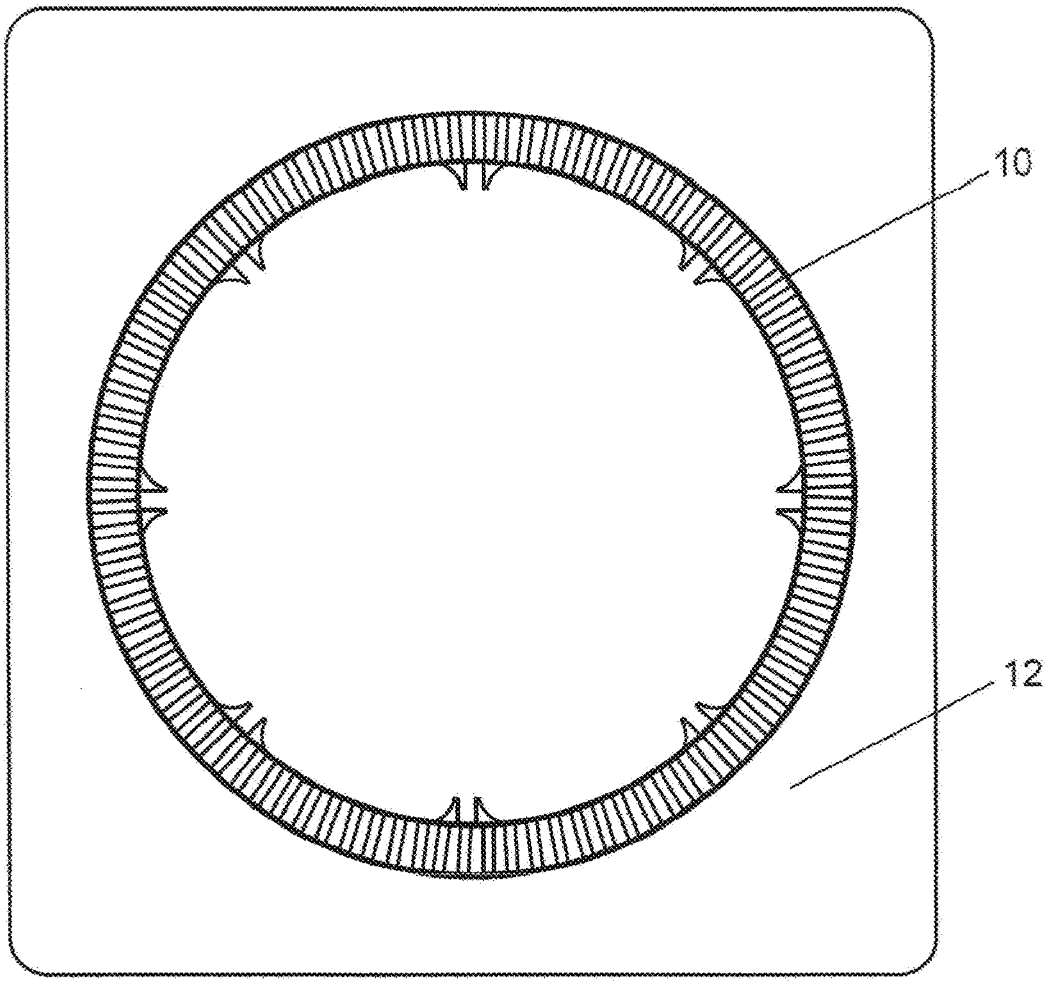
FIG. 1 is an illustration of one type of annular-shaped build that can be made with a powder bed fusion (PBF) additive manufacturing system.

Gas turbine engine compressor stator vane rings can be made using traditional manufacturing methods (e.g., forging, casting, and other traditional methods) or by additive manufacturing methods, including powder bed fusion (PBF) additive manufacturing (AM) methods. PBF AM is an additive manufacturing, or 3-D printing, technology that uses an energy source, such as a laser (PBF-LB) or electron beam (PBF-EB), to sinter or fuse metallic or polymeric particles together in a layer-by-layer process. PBF is typically used as an industrial process to make near net shape parts with various geometries. FIG. 1 shows a non-limiting, exemplary gas turbine engine compressor stator vane ring 10 made using a PBF AM process. Generally, annular-shaped parts, such as the gas turbine engine compressor stator vane ring 10, can be printed in their entirety in a large format PBF AM machine, often on a rectangular or square build plates 12. Regardless of the manufacturing method (i.e., traditional methods or AM methods) used to make gas turbine engine compressor stator vane rings, stator vane rings can have low yields that result in many parts being scrapped. The present disclosure is directed to replacement stator vanes made with AM methods, such as PBF AM methods, that can be used to address defects in gas turbine engine compressor stator vane rings.

Figure 2:
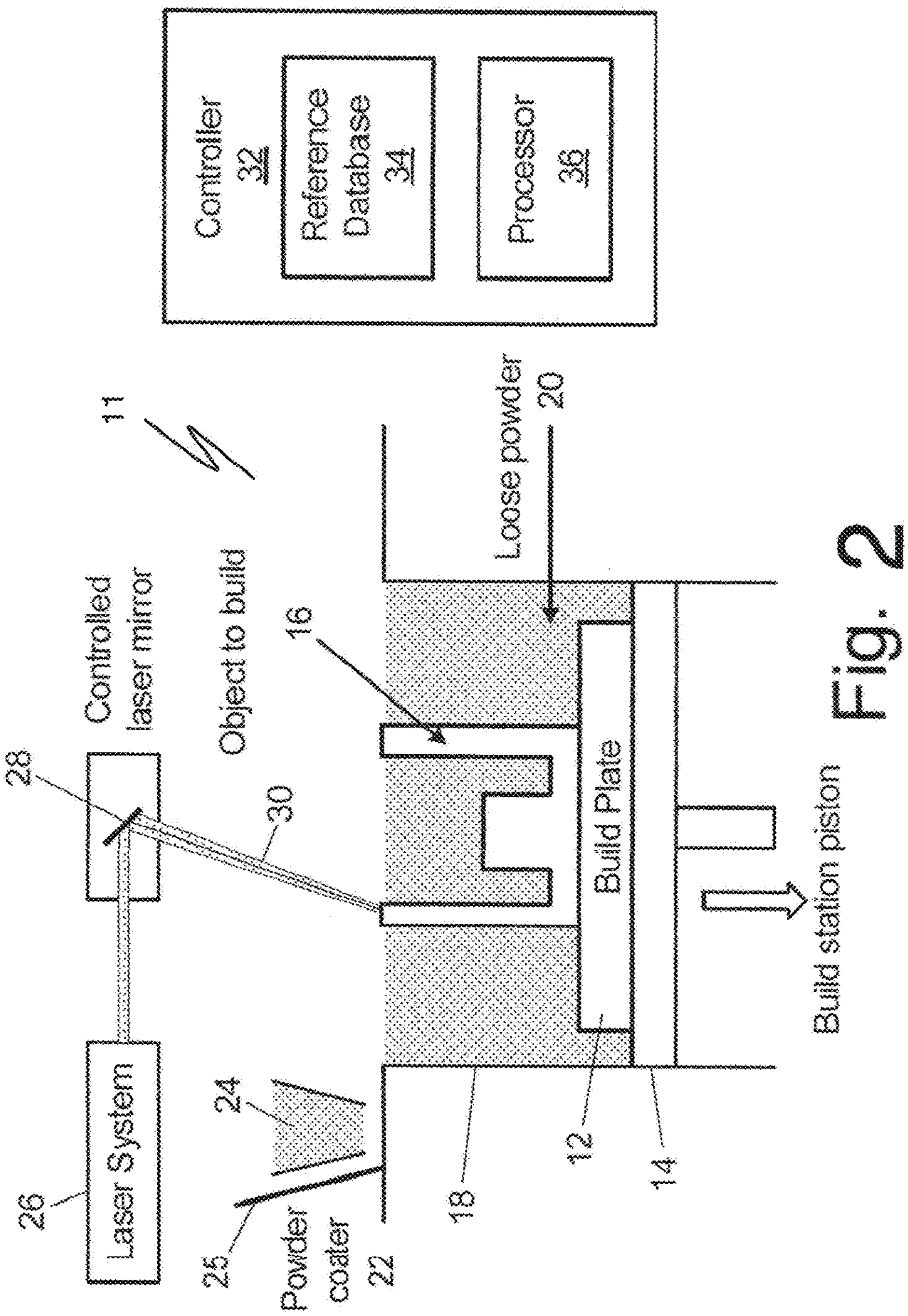
FIG. 2 is a schematic of an exemplary laser powder bed fusion (PBF-LB) additive manufacturing system.

FIG. 2 is a schematic of an exemplary, non-limiting PBF-LB system 11. While this disclosure is applicable to all PBF systems, including PBF-LB and PBF-EB systems, the exemplary, non-limiting PBF-LB system 11 will be used to describe the AM system and method of the disclosure. A typical PBF-LB system 11 includes a build plate 12, a build station piston 14 that adjusts the height of the build plate 12, a part or part 16 that is built on top of the build plate 12, a powder chamber 18 to contain loose, and unconsolidated build powder 20 that surrounds the part 16. A typical PBF-LB system 11 also includes a powder coater 22 that distributes additional build powder 24 over the part 16 after completion of each layer formed on the part 16. A recoater blade 25 follows the powder coater 22 as it distributes additional build powder 24 to create an even layer of consolidated built powder 20. The recoater blade 25 can be made from silicone, polyurethane, rubber, or other elastomeric materials. A laser system 26 combined with a controlled laser mirror 28 directs a laser beam 30 onto loose build powder 20 to form a melt pool (not shown) that, when solidified, forms a layer of the part 16. As each layer of the part 16 is formed, the build station piston 14 lowers the built plate 12 and part 16 by a predetermined distance that corresponds to the desired thickness of the next layer of the part 16. The powder coater 22 then moves across the top of the loose build powder 20 to distribute a layer of additional build powder 24 that will then be consolidated with the laser beam 30 to form the next layer of the part 16.

Controller 32 controls the height of the build plate 12 by moving the build station piston 14, which in turn controls the thickness of each layer of the part 16. Controller 32 also controls the movement of the powder coater 22 as it distributes additional build powder 24 and the movement of the laser beam 30 as it forms the melt pool that consolidates loose build powder 20 to form each layer of the part 16. For example, the controller 32 controls PBF-LB system 10 operating parameters, including:

(1) laser beam power, laser beam velocity, and laser beam spot size, build plate temperature, and layer thickness;
(2) temperature-dependent thermophysical properties of the powder;
(3) feedstock properties including average powder particle size; and
(4) laser hatching strategy including hatch distance, hatch delay time, and stripe width.

Controller 32 typically includes a reference database 34 and processor 36. Reference database 34 contains processing data relevant to the PBF-LB system 10, build powder to be used to produce the part 16, and the specific work piece 16 to be produced. Processor 36 contains programming to interface with the reference database 34 to control the PBF-LB system 10 to products parts, such as part 16, as is known to a person of ordinary skill in the art. Part 16 can be a near-net-shaped part (i.e., initial production of the part that is very close to the final (net) shape).

The PBF-LB system 11 can be used with a variety of build powders to produce part 24. For example the powder can be a metal powder or polymeric powder. Metallic powders compatible with typical PBF-LB systems 11 include aluminum, aluminum alloys (e.g., aluminum-lithium alloys), titanium, nickel, nickel alloys, and other metals and alloys known in the art. Polymeric powders compatible with typical PBF-LB systems 11 include a wide variety of polymers as known in the art.

Figure 3:
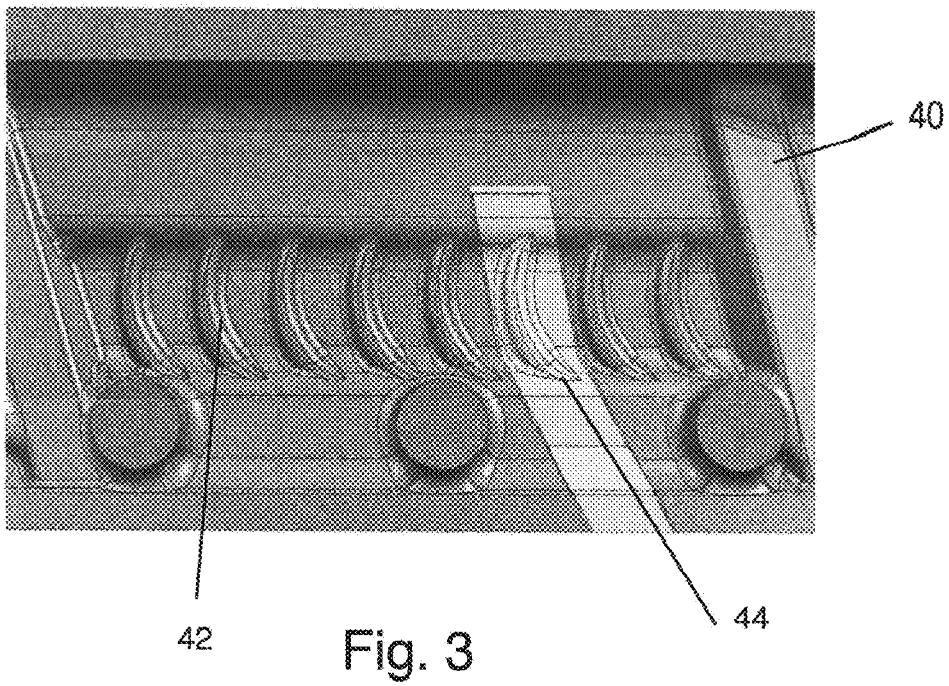
FIG. 3 is a view of a segment of a gas turbine engine compressor stator ring.

FIG. 3 shows a segment of an inner compressor stator vane ring 40 that includes a plurality of stator vanes 42 fixed into the stator vane ring 40. One of the stator vanes 42 is shaded to depict a donor stator vane 44 that was inserted into the stator vane ring 40 to replace a defective stator vane. One option for making a donor stator vane 44 is to use PBF-LB AM techniques. The defective stator vane 42 is excised from the stator vane ring 40, for example, using wire electrical discharge machining (EDM) techniques, to create an opening into which the donor stator vane 44 can be inserted and welded into place. The welding procedure used to secure the donor stator vane 44 to the stator vane ring 40 can result in weld spatter depositing onto the donor stator vane 44. Weld spatter deposited on the donor stator vane 44 requires removal, which is an additional operation that adds cost to the vane replacement process and can potentially damage the donor stator vane 44.

Figure 4:
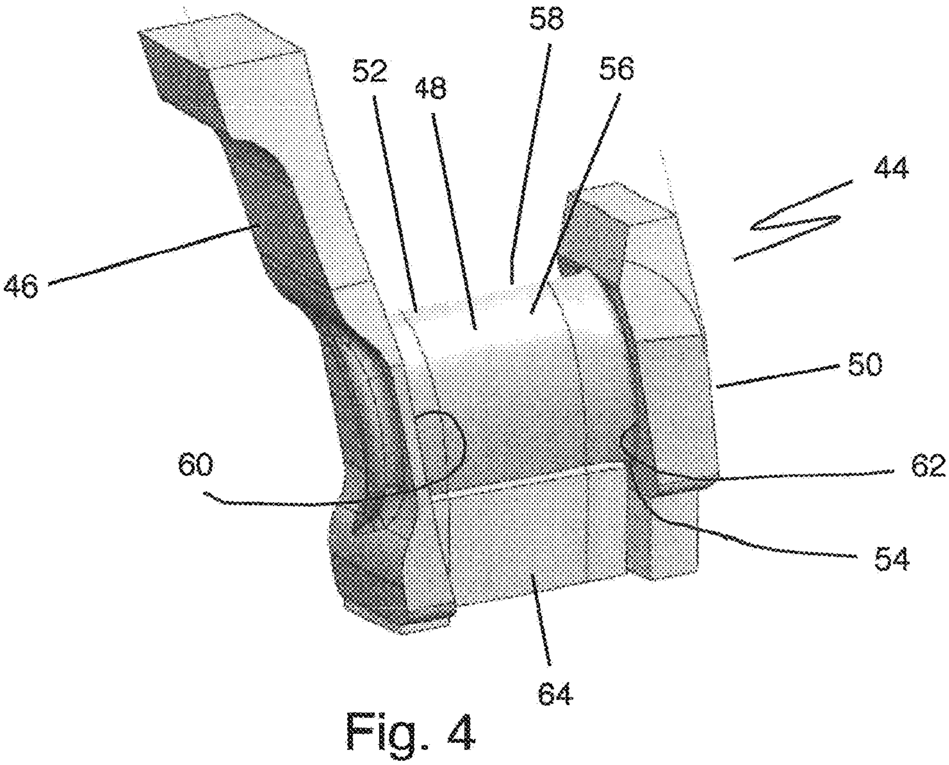
FIG. 4 is an example donor stator vane made on a PBF-LB manufacturing system.

FIG. 4 shows one configuration of a donor stator vane 44 made with PBF-LB AM techniques that includes an inner shroud segment 46, a vane segment 48, and an outer shroud segment 50. The vane segment 48 includes a leading edge 52, a trailing edge 54, a suction side 56, a pressure side 58, a vane inner base 60, and a vane outer base 62. The vane segment 48 has a support structure 64 formed on the trailing edge 54. The inner shroud segment 46, vane segment 48, and outer shroud segment 50 are portions of the donor stator vane 44 that are used operationally after the donor stator vane 44 is inserted into the stator vane ring 40. The support structure 64 is formed on the donor stator vane 44 during the PBF-LB AM process to support the donor stator vane 44 during processing. The support structure 64 is removed after the donor stator vane 44 is inserted into the stator vane ring 40 and welded into place. The donor stator vane 44 and all of its constituent parts (i.e., the inner shroud segment 46, vane segment 48, outer shroud segment 50 and support structure 64) should be made from the same material as the stator vane ring 40 and the other the stator vanes 42. For example, the donor stator vane 44, stator vane ring 40, and the other the stator vanes 42 can be made from any suitable material for a gas turbine engine compressor section component, such as titanium.

Figure 5:
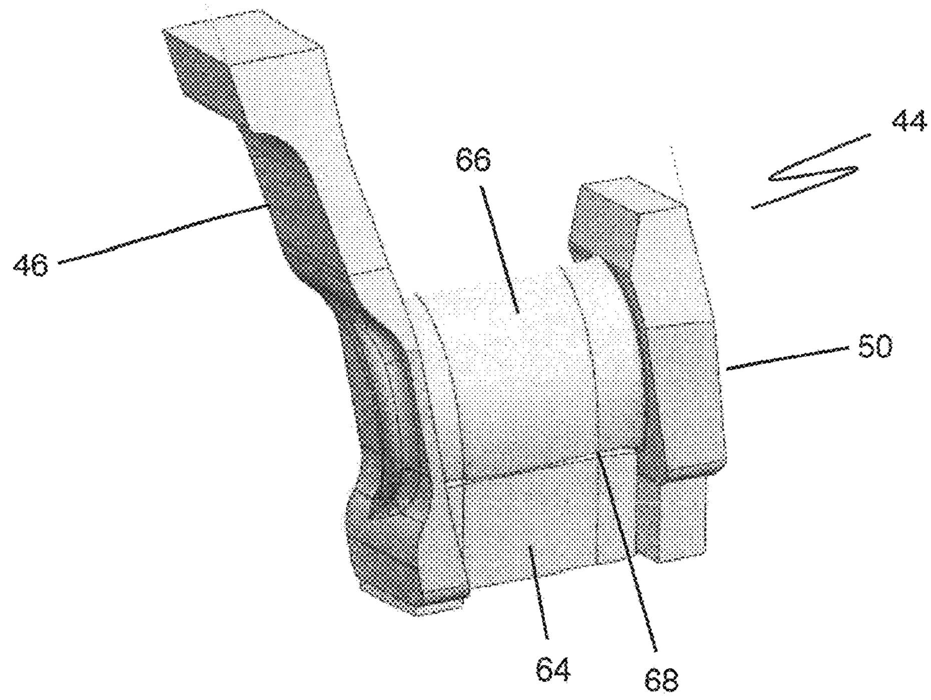
FIG. 5 is another example donor stator vane made on a PBF-LB manufacturing system.

FIG. 5 shows another configuration of a donor stator vane 44 made with PBF-LB AM techniques. The donor stator vane 44 of FIG. 5 includes an inner shroud segment 46, a vane segment 48 (not visible in FIG. 5), an outer shroud segment 50, a support structure 64 (formed on the trailing edge 54 of the vane segment 48 as in the example of FIG. 4), and a weld shield 66 that is formed above the vane segment 48 and is spaced away from the vane segment 48. The weld shield 66 obscures vane segment 48 in FIG. 5 due to its position above and spaced away from the vane segment 48. For example, the weld shield 66 can be spaced away from the vane segment 48 by at least 0.010 inches (0.254 mm). The weld shield 66 is formed integrally with (i.e., formed as a unit of the same structure during a single, continuous additive manufacturing process) the support structure 64 and is connected to the support structure 64 by connector 68. The connector 68 can be a very thin "line-on-line" structure that can be defined as an "infinitely thin" structure between the weld shield 66 and the support structure 64. For example, the connector 68 can be formed by a single laser beam pass during the PBF-LB AM process used to make the donor stator vane 44. The connector 68 can be at least 0.012 inches (0.3048 mm) thick, for example, between 0.012 inches (0.3048 mm) to 0.030 inches (0.762 mm) thick or between 0.015 inches (0.381 mm) to 0.030 inches (0.762 mm) thick or any other thickness deemed appropriate for a particular operation. The weld shield 66 is also a thin structure that can be about the thickness of a sheet of paper, for example, about 0.004 inches (0.1016 mm) thick. In various examples, the weld shield 66 can be between 0.002 inches (0.0508 mm) and 0.012 inches (0.3048 mm) thick.

Figure 6:
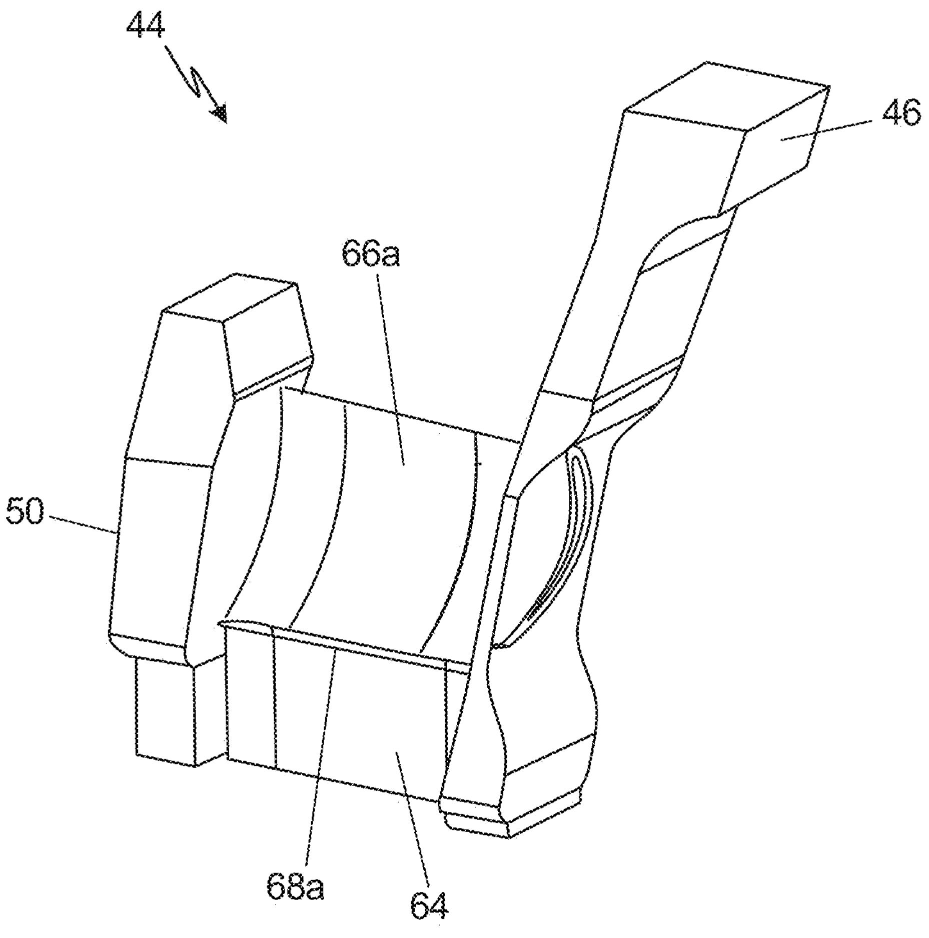
FIG. 6 is yet another example donor stator vane made on a PBF-LB manufacturing system.

While the example for FIG. 5 depicts a single weld shield 66 over the suction side 56 of the vane segment 48 (see FIG. 4), in another example (see FIG. 6), the donor stator vane 44 can have one (a first) weld shield 66 positioned over the suction side 56 of the vane segment 48 and a second weld shield **66*a* positioned over the pressure side 58 of the vane segment 48. As with the first weld shield 66 discussed above, the second weld shield 66*a* can be connected to the support structure 64 with a second connector 68*a*. The second weld shield 66*a* and second connector 68*a* are similarly formed integrally (i.e., i.e., formed as a unit of the same structure during a single, continuous additive manufacturing process) with the support structure 64 and have the same thickness as the first weld shield 66 and connector 68 discussed above and be spaced away from the pressure side 58 of the vane segment 48 by the same distance that the first weld shield 66 is spaced away from the suction side 56 of the vane segment 48. The weld shield 66 (or a combination of the first weld shield 66 and the second weld shield 66***a*) remains in place after it is formed integrally with the support structure 64 and after removal from the PBF-LP machine build plate.

After being formed, the donor stator vane 44 of FIG. 5 (i.e., having either a single weld shield 66, or a combination of the first weld shield 66 and a second weld shield 66*a*) is inserted in the position in the vane ring 40 from which the defective vane 42 was excised and the donor stator vane 44 is welded into place. Weld spatter from the weld operation deposits onto the weld shield 66 (or a combination of the first weld shield 66 and the second weld shield 66*a*) rather than on the vane segment 48, obviating the need to remove weld spatter from the vane segment 48 as would be the case for a donor stator vane 44 that does not include the weld shield 66 (or a combination of the first weld shield 66 and the second weld shield 66*a*). The welding operation used to secure the donor stator vane 44 to the vane ring 40 leaves a residual indication (i.e., the weld bead around the donor stator vane 44) that the vane replacement was made.

Figure 7:
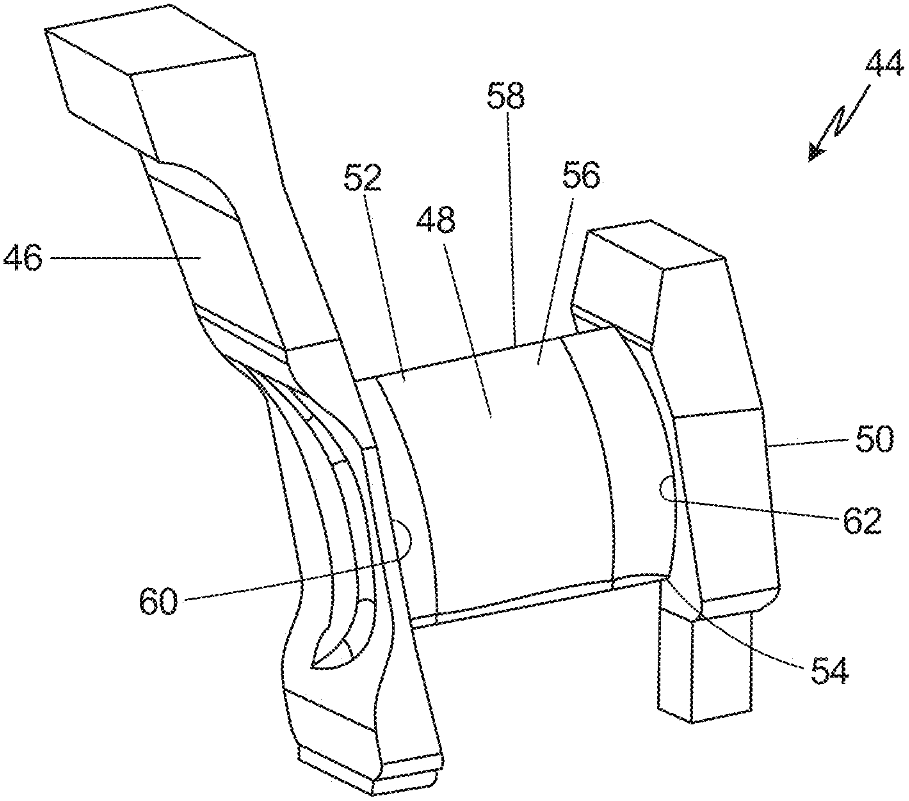
FIG. 7 is still another example donor stator vane made on a PBF-LB manufacturing system.

The weld shield 66 (or a combination of the first weld shield 66 and the second weld shield 66*a*) should remain in place during the weld process used to secure the donor stator vane 44 to vane ring 40. Once the donor stator vane 44 is welded to the vane ring 40, the weld shield 66 (or a combination of the first weld shield 66 and the second weld shield 66*a*) can be removed from the support structure 64. Because of the very thin connector 68, 68*a* connecting the weld shield 66 (or a combination of the first weld shield 66 and the second weld shield 66*a*) to the support structure 64, the weld shield 66 (or a combination of the first weld shield 66 and the second weld shield 66*a*) can be removed by hand or using hand tools while leaving little or no residual material. The support structure 64 should likewise be removed from the donor stator vane 44 using hand tools or light machining leaving little or no residual material. The resulting vane structure is depicted in FIG. 7. Any residual material remaining after removal of the weld shield 66 and supporting structure 64 can be removed by media blasting or other mechanical techniques. Because the support structure 64 is formed on the trailing edge 54 of the vane segment 48, any residual material remaining after all of the operations is in a less aerodynamically sensitive portion of the vane segment 48 than if it had been attached to the leading edge 52 of the vane segment 48.

The donor stator vane 44 and related processes of this disclosure provide a number of benefits. Printing the weld shield 66 does not significantly increase build time and removal can be done manually without extensive fixturing or tooling. Mitigating the need to further reduce surface roughness will reduce cost of the repair. Weld spatter will not deposit on the critical surfaces of the vane segment 48 and instead land on the weld shield 66 which functions as an ablative surface. This technique can be applied to other similar vanes additively manufactured using PBF-LB and is not limited specifically to a particular stage.

Discussion of Possible Embodiments

The following are non-exclusive descriptions of possible embodiments of the present invention.

A stator vane for a gas turbine engine combustor comprises a vane segment having a vane having a leading edge, a trailing edge, a suction side, a pressure side, a vane inner base, and a vane outer base; an inner shroud segment attached to the vane at the vane inner base; and an outer shroud segment attached to the vane at the vane outer base. The stator vane further comprises a support structure attached to the vane at a vane trailing edge; and a first weld shield attached to the support structure by a first connector. The first weld shield is positioned over and spaced away from the suction side, and the vane, inner shroud segment, outer shroud segment, support structure, and first weld shield are integrally formed during a single, continuous additive manufacturing process.

The stator vane of the preceding paragraph can optionally include, additionally and/or alternatively, any one or more of the following features, configurations and/or additional elements:

The stator vane of the preceding paragraph, wherein the first weld shield is between 0.002 inches (0.0508 mm) and 0.012 inches (0.3048 mm) thick, the first connector is at least 0.012 inches (0.3048 mm) thick, and the first weld shield is spaced away from the suction side by at least 0.010 inches (0.254 mm).

The stator vane of any of the preceding paragraphs, wherein the first weld shield and the support structure are configured to be removed from the vane segment after installation of the stator vane into a stator vane ring.

The stator vane of any of the preceding paragraphs, wherein the additive manufacturing process is a powder bed fusion additive manufacturing process.

The stator vane of any of the preceding paragraphs, further comprising: a second weld shield attached to the support structure by a second connector, wherein the second weld shield is positioned over and spaced away from the pressure side, wherein the vane, inner shroud segment, outer shroud segment, support structure, first connector, first weld shield, second connector, and second weld shield are integrally formed during a single, continuous additive manufacturing process.

The stator vane of the preceding paragraph, wherein the first weld shield is between 0.002 inches (0.0508 mm) and 0.012 inches (0.3048 mm) thick, the first connector is at least 0.012 inches (0.3048 mm) thick, and the first weld shield is spaced away from the suction side by at least 0.010 inches (0.254 mm) and the second weld shield is between 0.002 inches (0.0508 mm) and 0.012 inches (0.3048 mm) thick, the second connector is at least 0.012 inches (0.3048 mm) thick, and the second weld shield is spaced away from the pressure side by at least 0.010 inches (0.254 mm).

The stator vane of the preceding paragraph, wherein the first weld shield, the second weld shield, and the support structure are configured to be removed from the vane segment after installation of the stator vane into a stator vane ring.

The stator vane of the preceding paragraph, wherein the additive manufacturing process is a powder bed fusion additive manufacturing process.

A method of making a stator vane for a gas turbine engine combustor comprises integrally forming during a single, continuous additive manufacturing process a vane segment including a vane having a leading edge, a trailing edge, a suction side, a pressure side, a vane inner base, and a vane outer base; an inner shroud segment attached to the vane at the vane inner base; and an outer shroud segment attached to the vane at the vane outer base; a support structure attached to the vane at a vane trailing edge; and a first weld shield attached to the support structure by a first connector, wherein the first weld shield is positioned over and spaced away from the suction side.

The method of the preceding paragraph can optionally include, additionally and/or alternatively, any one or more of the following features, configurations and/or additional elements:

The method of the preceding paragraph, wherein the first weld shield is between 0.002 inches (0.0508 mm) and 0.012 inches (0.3048 mm) thick, the first connector is at least 0.012 inches (0.3048 mm) thick, and the first weld shield is spaced away from the suction side by at least 0.010 inches (0.254 mm).

The method of any of the preceding paragraphs, wherein the first weld shield and the support structure are configured to be removed from the vane segment after installation of the stator vane into a stator vane ring.

The method of any of the preceding paragraphs, wherein the additive manufacturing process is a powder bed fusion additive manufacturing process.

The method of any of the preceding paragraphs, further comprising integrally forming during the same single, continuous additive manufacturing process a second weld shield attached to the support structure by a second connector, wherein the second weld shield is positioned over and spaced away from the pressure side.

The method of the preceding paragraph, wherein the first weld shield is between 0.002 inches (0.0508 mm) and 0.012 inches (0.3048 mm) thick, the first connector is at least 0.012 inches (0.3048 mm) thick, and the first weld shield is spaced away from the suction side by at least 0.010 inches (0.254 mm) and the second weld shield is between 0.002 inches (0.0508 mm) and 0.012 inches (0.3048 mm) thick, the second connector is at least 0.012 inches (0.3048 mm) thick, and the second weld shield is spaced away from the pressure side by at least 0.010 inches (0.254 mm).

The method of the preceding paragraph, wherein the first weld shield, the second weld shield, and the support structure are configured to be removed from the vane segment after installation of the stator vane into a stator vane ring.

The method of the preceding paragraph, wherein the additive manufacturing process is a powder bed fusion additive manufacturing process.

A method of replacing a damaged stator vane in a gas turbine engine combustor stator vane ring, comprising identifying the damaged stator vane in the gas turbine engine combustor stator vane ring; removing the damaged stator vane from the gas turbine engine combustor stator vane ring to create an opening in the gas turbine engine combustor stator vane ring; inserting into the opening in the gas turbine engine combustor stator vane ring a stator vane of claim 1; and removing the first weld shield and the support shield from the stator vane.

The method of the preceding paragraph can optionally include, additionally and/or alternatively, any one or more of the following features, configurations and/or additional elements:

The method of the preceding paragraph, wherein the first weld shield is between 0.002 inches (0.0508 mm) and 0.012 inches (0.3048 mm) thick, the first connector is at least 0.012 inches (0.3048 mm) thick, and the first weld shield is spaced away from the suction side by at least 0.010 inches (0.254 mm).

The method of the preceding paragraph, wherein the steps of inserting into the opening in the gas turbine engine combustor stator vane ring a stator vane of claim 1; and removing the first weld shield and the support shield from the stator vane; are replaced with the steps of: inserting into the opening in the gas turbine engine combustor stator vane ring a stator vane of claim 5; and removing the first weld shield, the second weld shield, and the support shield from the stator vane.

The method of the preceding paragraph, wherein the first weld shield is between 0.002 inches (0.0508 mm) and 0.012 inches (0.3048 mm) thick, the first connector is at least 0.012 inches (0.3048 mm) thick, and the first weld shield is spaced away from the suction side by at least 0.010 inches (0.254 mm) and the second weld shield is between 0.002 inches (0.0508 mm) and 0.012 inches (0.3048 mm) thick, the second connector is at least 0.012 inches (0.3048 mm) thick, and the second weld shield is spaced away from the pressure side by at least 0.010 inches (0.254 mm).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A stator vane for a gas turbine engine combustor comprising:

a vane segment comprising:

a vane having a leading edge, a trailing edge, a suction side, a pressure side, a vane inner base, and a vane outer base;

an inner shroud segment attached to the vane at the vane inner base; and an outer shroud segment attached to the vane at the vane outer base;

a support structure attached to the vane at a vane trailing edge; and a first weld shield attached to the support structure by a first connector, wherein the first weld shield is positioned over and spaced away from the suction side, wherein the vane, inner shroud segment, outer shroud segment, support structure, and first weld shield are integrally formed during a single, continuous additive manufacturing process.

2. The stator vane of claim 1, wherein the first weld shield is between 0.002 inches (0.0508 mm) and 0.012 inches (0.3048 mm) thick, the first connector is at least 0.012 inches (0.3048 mm) thick, and the first weld shield is spaced away from the suction side by at least 0.010 inches (0.254 mm).

3. The stator vane of claim 1, wherein the first weld shield and the support structure are configured to be removed from the vane segment after installation of the stator vane into a stator vane ring.

4. The stator vane of claim 1, wherein the additive manufacturing process is a powder bed fusion additive manufacturing process.

5. The stator vane of claim 1, further comprising:

a second weld shield attached to the support structure by a second connector, wherein the second weld shield is positioned over and spaced away from the pressure side, wherein the vane, inner shroud segment, outer shroud segment, support structure, first connector, first weld shield, second connector, and second weld shield are integrally formed during a single, continuous additive manufacturing process.

6. The stator vane of claim 5, wherein the first weld shield is between 0.002 inches (0.0508 mm) and 0.012 inches (0.3048 mm) thick, the first connector is at least 0.012 inches (0.3048 mm) thick, and the first weld shield is spaced away from the suction side by at least 0.010 inches (0.254 mm) and the second weld shield is between 0.002 inches (0.0508 mm) and 0.012 inches (0.3048 mm) thick, the second connector is at least 0.012 inches (0.3048 mm) thick, and the second weld shield is spaced away from the pressure side by at least 0.010 inches (0.254 mm).

7. The stator vane of claim 5, wherein the first weld shield, the second weld shield, and the support structure are configured to be removed from the vane segment after installation of the stator vane into a stator vane ring.

8. The stator vane of claim 5, wherein the additive manufacturing process is a powder bed fusion additive manufacturing process.

9. A method of making a stator vane for a gas turbine engine combustor comprising:
- integrally forming during a single, continuous additive manufacturing process:
- a vane segment comprising:
  - a vane having a leading edge, a trailing edge, a suction side, a pressure side, a vane inner base, and a vane outer base;
  - an inner shroud segment attached to the vane at the vane inner base; and
  - an outer shroud segment attached to the vane at the vane outer base;
- a support structure attached to the vane at a vane trailing edge; and
- a first weld shield attached to the support structure by a first connector, wherein the first weld shield is positioned over and spaced away from the suction side.

10. The method of claim 9, wherein the first weld shield is between 0.002 inches (0.0508 mm) and 0.012 inches (0.3048 mm) thick, the first connector is at least 0.012 inches (0.3048 mm) thick, and the first weld shield is spaced away from the suction side by at least 0.010 inches (0.254 mm).

11. The method of claim 9, wherein the first weld shield and the support structure are configured to be removed from the vane segment after installation of the stator vane into a stator vane ring.

12. The method of claim 9, wherein the additive manufacturing process is a powder bed fusion additive manufacturing process.

13. The method of claim 9, further comprising:
- integrally forming during the same single, continuous additive manufacturing process:
- a second weld shield attached to the support structure by a second connector, wherein the second weld shield is positioned over and spaced away from the pressure side.

14. The method of claim 13, wherein the first weld shield is between 0.002 inches (0.0508 mm) and 0.012 inches (0.3048 mm) thick, the first connector is at least 0.012 inches (0.3048 mm) thick, and the first weld shield is spaced away from the suction side by at least 0.010 inches (0.254 mm) and the second weld shield is between 0.002 inches (0.0508 mm) and 0.012 inches (0.3048 mm) thick, the second connector is at least 0.012 inches (0.3048 mm) thick, and the second weld shield is spaced away from the pressure side by at least 0.010 inches (0.254 mm).

15. The method of claim 13, wherein the first weld shield, the second weld shield, and the support structure are configured to be removed from the vane segment after installation of the stator vane into a stator vane ring.

16. The method of claim 13, wherein the additive manufacturing process is a powder bed fusion additive manufacturing process.

17. A method of replacing a damaged stator vane in a gas turbine engine combustor stator vane ring, comprising:
- identifying the damaged stator vane in the gas turbine engine combustor stator vane ring;
- removing the damaged stator vane from the gas turbine engine combustor stator vane ring to create an opening in the gas turbine engine combustor stator vane ring;
- inserting into the opening in the gas turbine engine combustor stator vane ring a stator vane of claim 1; and
- removing the first weld shield and the support shield from the stator vane.

18. The method of claim 17, wherein the first weld shield is between 0.002 inches (0.0508 mm) and 0.012 inches (0.3048 mm) thick, the first connector is at least 0.012 inches (0.3048 mm) thick, and the first weld shield is spaced away from the suction side by at least 0.010 inches (0.254 mm).

19. The method of claim 17, wherein the steps of
- inserting into the opening in the gas turbine engine combustor stator vane ring a stator vane of claim 1; and
- removing the first weld shield and the support shield from the stator vane;
- are replaced with the steps of:
- inserting into the opening in the gas turbine engine combustor stator vane ring a stator vane of claim 5; and
- removing the first weld shield, the second weld shield, and the support shield from the stator vane.

20. The method of claim 19, wherein the first weld shield is between 0.002 inches (0.0508 mm) and 0.012 inches (0.3048 mm) thick, the first connector is at least 0.012 inches (0.3048 mm) thick, and the first weld shield is spaced away from the suction side by at least 0.010 inches (0.254 mm) and the second weld shield is between 0.002 inches (0.0508 mm) and 0.012 inches (0.3048 mm) thick, the second connector is at least 0.012 inches (0.3048 mm) thick, and the second weld shield is spaced away from the pressure side by at least 0.010 inches (0.254 mm).

* * * * *